United States Patent
Lee et al.

(10) Patent No.: US 11,605,811 B2
(45) Date of Patent: Mar. 14, 2023

(54) NEGATIVE ELECTRODE ACTIVE MATERIAL, PREPARATION METHOD THEREOF, NEGATIVE ELECTRODE INCLUDING THE NEGATIVE ELECTRODE ACTIVE MATERIAL, AND SECONDARY BATTERY INCLUDING THE NEGATIVE ELECTRODE

(71) Applicant: LG CHEM, LTD., Seoul (KR)

(72) Inventors: Su Min Lee, Daejeon (KR); Yong Ju Lee, Daejeon (KR); Rae Hwan Jo, Daejeon (KR); Dong Hyuk Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 294 days.

(21) Appl. No.: 16/772,585

(22) PCT Filed: Jan. 30, 2019

(86) PCT No.: PCT/KR2019/001297
§ 371 (c)(1),
(2) Date: Jun. 12, 2020

(87) PCT Pub. No.: WO2019/151774
PCT Pub. Date: Aug. 8, 2019

(65) Prior Publication Data
US 2020/0388833 A1      Dec. 10, 2020

(30) Foreign Application Priority Data
Jan. 30, 2018   (KR) ................ 10-2018-0011185

(51) Int. Cl.
| | |
|---|---|
| *H01M 4/36* | (2006.01) |
| *H01M 4/62* | (2006.01) |
| *H01M 10/0525* | (2010.01) |
| *H01M 4/583* | (2010.01) |
| *H01M 4/58* | (2010.01) |

(52) U.S. Cl.
CPC ............. *H01M 4/366* (2013.01); *H01M 4/58* (2013.01); *H01M 4/583* (2013.01); *H01M 4/5825* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | |
|---|---|---|
| 2012/0052656 A1 | 3/2012 | Bellman et al. |
| 2013/0149605 A1 | 6/2013 | Kakehata et al. |
| 2015/0221950 A1* | 8/2015 | Minami ............... H01M 4/366 |
| | | 429/223 |
| 2016/0372753 A1 | 12/2016 | Fukasawa et al. |
| 2017/0117543 A1* | 4/2017 | Park .................. H01M 4/366 |
| 2017/0271651 A1 | 9/2017 | Behan et al. |
| 2018/0013132 A1 | 1/2018 | Chiba et al. |
| 2018/0090750 A1* | 3/2018 | Oh ..................... H01M 4/366 |
| 2019/0051897 A1 | 2/2019 | Kamo et al. |

FOREIGN PATENT DOCUMENTS

| | | |
|---|---|---|
| CN | 103151432 A | 6/2013 |
| CN | 107431249 A | 12/2017 |
| EP | 3 136 477 A1 | 3/2017 |
| JP | 2010-170943 A | 8/2010 |
| JP | 2012-33317 A | 2/2012 |
| JP | 2017-152375 A | 8/2017 |
| JP | 2017-536676 A | 12/2017 |
| KR | 10-2012-0101971 A | 9/2012 |
| KR | 10-2014-0089643 A | 7/2014 |
| KR | 10-2015-0112746 A | 10/2015 |
| KR | 10-1586816 B1 | 1/2016 |
| KR | 10-1676405 B1 | 11/2016 |
| WO | WO 2014/049992 A1 | 4/2014 |

OTHER PUBLICATIONS

European Patent Office Office Action dated Dec. 18, 2020 for Application No. 19746961.2.
International Search Report for PCT/KR2019/001297 dated May 9, 2019.

* cited by examiner

*Primary Examiner* — Laura Weiner
(74) *Attorney, Agent, or Firm* — Birch, Stewart, Kolasch & Birch, LLP

(57) ABSTRACT

A negative electrode active material including a core containing $SiO_x$ ($0 \leq x < 2$) and a lithium-containing compound, and a shell disposed on the core and containing $SiO_x$ ($0 \leq x < 2$) and magnesium silicate.

9 Claims, No Drawings

NEGATIVE ELECTRODE ACTIVE MATERIAL, PREPARATION METHOD THEREOF, NEGATIVE ELECTRODE INCLUDING THE NEGATIVE ELECTRODE ACTIVE MATERIAL, AND SECONDARY BATTERY INCLUDING THE NEGATIVE ELECTRODE

TECHNICAL FIELD

Cross-Reference to Related Applications

This application claims the benefit of Korean Patent Application No. 10-2018-0011185, filed on Jan. 30, 2018, in the Korean Intellectual Property Office, the disclosure of which is incorporated herein in its entirety by reference.

TECHNICAL FIELD

The present invention relates to a negative electrode active material, a method for preparing the negative electrode active material, a negative electrode including the negative electrode active material, and a secondary battery including the negative electrode, and more specifically, to a negative electrode active material including a core containing $SiO_x$ (0≤x<2) and a lithium-containing compound, and a shell disposed on the core and containing $SiO_x$ (0≤x<2) and magnesium silicate.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having high energy density, that is lithium secondary batteries having high capacity, have been subjected to considerable research and also have been commercialized and widely used.

In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a silicon-based particle having high discharge capacity may be used. However, a silicon-based particle such as $SiO_x$ (0≤x<2) has low initial efficiency, and the volume thereof excessively changes during charging and discharging. Therefore, there arises a problem in that the lifespan and safety of a battery are deteriorated. Particularly, cracks are generated in the silicon-based particle as a charging and discharging cycle is repeated, thereby lifespan is reduced and mechanical stability is deteriorated.

Typically, in order to solve such a problem, techniques for forming a coating layer on the surface of a silicon-based particle have been used. Specifically, there is a method for forming a carbon coating layer on an outer surface of a silicon-based particle (Korean Patent Laid-Open Publication No. 10-2015-0112746). However, even when the carbon coating layer is formed, the initial efficiency and lifespan of a battery is not significantly improved, and the effect of reducing battery resistance is not significant.

Therefore, there has been a demand for a negative electrode active material having a high initial efficiency and the volume change of which may be effectively controlled during charging and discharging, thereby improving the lifespan properties of a battery.

PRIOR ART DOCUMENT

Patent Document (Patent Document 1) Korean Patent Laid-Open Publication No. 10-2015-0112746

DISCLOSURE OF THE INVENTION

Technical Problem

An aspect of the present invention provides a negative electrode active material having a high initial efficiency and the volume change of which may be effectively controlled during charging and discharging, thereby improving the lifespan properties of a battery, a preparation method thereof, a negative electrode including the negative electrode active material, and a secondary battery including the negative electrode.

Technical Solution

According to an aspect of the present invention, there is provided a negative electrode active material including a core containing $SiO_x$ (0≤x<2) and a lithium-containing compound, and a shell disposed on the core and containing $SiO_x$ (0≤x<2) and magnesium silicate.

According to another aspect of the present invention, there is provided a method for preparing a negative electrode active material, the method including: forming a first mixture by mixing an $SiO_x$ (0<x<2) particle and magnesium powder; forming a silicon-based particle containing magnesium silicate by subjecting the first mixture to a first heat treatment; forming a second mixture by mixing the silicon-based particle and lithium powder; and subjecting the second mixture to a second heat treatment.

According to yet another aspect of the present invention, there is provided a negative electrode including the negative electrode active material.

According to yet another aspect of the present invention, there is provided a secondary battery including the negative electrode.

Advantageous Effects

According to an aspect of the present invention, the negative electrode active material includes a core containing a lithium-containing compound and a shell containing magnesium silicate. When preparing such negative electrode active material, process of forming magnesium silicate and forming a lithium-containing compound in a core portion in which magnesium silicate is not formed are performed, so that a metal-containing compound may be uniformly distributed in the negative electrode active material. Accordingly, during the operation of a battery, non-uniform volume expansion of the negative electrode active material is suppressed, so that cracks may be reduced. Also, magnesium silicate has high harness, so that the volume expansion of the negative electrode active material and the generation of cracks may be further suppressed by the shell containing the magnesium silicate. Accordingly, the initial efficiency of a secondary battery may be improved, and the volume expansion of Si and/or $SiO_2$ contained in the negative electrode active material is effectively controlled, so that the lifespan properties of the battery may be improved.

MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material according to an embodiment of the present invention may include a core containing $SiO_x$ (0≤x<2) and a lithium-containing compound, and a shell disposed on the core and containing $SiO_x$ (0≤x<2) and magnesium silicate.

The core may contain SiOx (0≤x<2). The SiOx (0≤x<2) may include Si and $SiO_2$. That is, the x corresponds to the number ratio of O to Si contained in the SiOx (0≤x<2). When the core contains SiOx (0≤x<2), the discharge capacity of a secondary battery may be improved. The x may be, more specifically, 0.5 to 1.5.

The $SiO_2$ may be crystalline $SiO_2$. The crystalline $SiO_2$ may be quartz, cristobalite, or tridymite.

The average particle diameter ($D_{50}$) of the core may be 1 µm to 20 µm, specifically 3 µm to 10 µm. When the average particle diameter range is satisfied, side reactions with an electrolyte may be reduced, and a defect rate may be reduced in the process of applying a negative electrode slurry on a current collector and roll-pressing the same. Also, when charging/discharging a battery, the generation of cracks in the negative electrode active material may be reduced. In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

The core may contain a lithium-containing compound. The lithium-containing compound may be a compound formed by doping lithium metal on a silicon-based particle when preparing the negative electrode active material. The lithium-containing compound may improve the initial efficiency of a secondary battery, and increase the energy density of a negative electrode. Also, when a lithium-containing compound is included in a negative electrode active material, a metal-containing compound including magnesium silicate and a lithium-containing compound may be uniformly dispersed and present in the negative electrode active material, and thus, during charging/discharging of a battery, non-uniform volume expansion is suppressed, so that the generation of cracks may be reduced. Accordingly, the lifespan properties of the battery may be improved.

The lithium-containing compound may contain at least one selected from the group consisting of lithium silicate and lithium silicide. The lithium silicate may include at least any one selected from the group consisting of $Li_2Si_2O_5$, $Li_2SiO_3$, and $Li_4SiO_4$. Since the core contains lithium silicate, the initial efficiency of the secondary battery and the energy density of the negative electrode may be improved.

The lithium silicide may include $Li_ySi$(2<y<5), specifically at least any one selected from the group consisting of $Li_{4.4}Si$, $Li_{3.75}Si$, $Li_{3.25}Si$, and $Li_{2.33}Si$.

The lithium silicate contained in the core may be included in an amount of 0.1 wt % to 50 wt %, specifically 1 wt % to 30 wt %, more specifically, 3 wt % to 10 wt % based on the total weight of the negative electrode active material. When the above range is satisfied, the initial efficiency and lifespan properties of the battery may be improved. The type of the lithium silicate may be determined by XRD, and the content of the lithium silicate may be measured by an ICP method. However, the present invention is not particularly limited thereto.

The shell may be disposed on the core. Specifically, the shell may be present on at least a portion of the surface area of the core, more specifically, the entire surface of the core.

The shell may contain $SiO_x$ (0≤x<2). At this time, the $SiO_x$ (0≤x<2) is the same as the $SiO_x$ (0≤x<2) described above, and thus the description thereof will be omitted.

The shell may be contain magnesium silicate. The magnesium silicate may be a compound formed by doping magnesium metal on a silicon-based particle when preparing the negative electrode active material. The magnesium silicate may improve the initial efficiency of the secondary battery. Also, magnesium silicate has high harness, so that the volume expansion of the negative electrode active material and the generation of cracks may be further suppressed by the shell containing the magnesium silicate.

Specifically, the magnesium silicate may include at least one selected from the group consisting of $Mg_2SiO_4$, and $MgSiO_3$. Since the shell contains the magnesium silicate, the volume expansion of the negative electrode active material and the generation of cracks may be further suppressed.

The magnesium silicate contained in the shell may be included in an amount of 0.1 wt % to 50 wt %, specifically 1 wt % to 30 wt %, more specifically, 3 wt % to 10 wt % based on the total weight of the negative electrode active material. When the above range is satisfied, the initial efficiency and lifespan properties of the battery may be improved. The type of the magnesium silicate may be determined by XRD, and the content of the magnesium silicate may be measured by an ICP method. However, the present invention is not particularly limited thereto.

The thickness of the shell may be 0.02 µm to 5 µm, specifically 0.3 µm to 3 µm, more specifically 0.5 µm to 1 µm. When the above range is satisfied, the initial efficiency and lifespan properties of the battery may be further improved. Although not limited thereto, the thickness of the shell may be measured by SEM. Also, the thickness of the shell refers to the distance from the surface of the negative active material to a point at which magnesium silicate is detected.

The shell may further include a lithium-containing compound, and the lithium-containing compound may be the same as the lithium-containing compound contained in the core. Accordingly, the lithium-containing compound contained in the core may be included in an amount of 70 wt % to 100 wt %, specifically 90 wt % to 100 wt % based on the total weight of the lithium-containing compound present in the negative electrode active material. In other words, when the lithium-containing compound contained in the core is 100 wt % based on the total weight of the lithium-containing compound present in the negative electrode active material, it means that the lithium-containing compound is contained only in the core. Alternatively, when the lithium-containing compound contained in the core is not 100 wt % based on the total weight of the lithium-containing compound present in the negative electrode active material, it means that the lithium-containing compound may be also present in the shell.

The average particle diameter ($D_{50}$) of the negative electrode active material may be 1 μm to 20 μm, specifically 3 μm to 10 μm. When the average particle diameter range is satisfied, side reactions with an electrolyte may be reduced, and a defect rate may be reduced in the process of applying a negative electrode slurry on a current collector and roll-pressing the same. Also, when charging/discharging a battery, the generation of cracks in the negative electrode active material may be reduced.

When preparing the negative electrode active material, a heat treatment is performed at a relatively low temperature rather than by a preparation method that is accompanied by a high-temperature heat treatment such as milling. Therefore, the negative electrode active material may not include a silicon crystal grain or may include a silicon crystal grain, but the particle diameter of the silicon crystal grain may be small. Accordingly, during charging/discharging of a battery, excessively volume expansion of negative electrode active material may be suppressed, so that the lifespan properties of the battery may be improved.

When the negative electrode active material includes a silicon crystal grain, the particle diameter of the silicon crystal grain may be 50 nm or less, specifically 30 nm or less, more specifically 20 nm or less. For example, the particle diameter of the silicon crystal grain may be 8 nm to 15 nm.

The presence of the silicon crystal grain and the particle diameter thereof may be confirmed by an X-Ray Diffraction analysis method. Specifically, the prepared negative electrode active material may be subjected to XRD analysis to confirm a peak 111 of a silicon, and then the particle diameter L of the silicon crystal grain may be calculated through the following equation (P.Sherrer equation).

$$L=(\kappa \times \lambda)/(\beta \times \cos \theta)$$

In the above equation, L is the particle diameter (unit: nm) of a silicon crystal grain, κ, which is the shape factor, is 0.9 (element for particle shape with no unit), λ is 0.154056 (unit: nm), β is the Full Width at Half-Maximum of the peak 111 (unit: radian).

A negative electrode active material according to another embodiment of the present invention is similar to the above-described negative electrode active material according to an embodiment. However, there is a difference in that the negative electrode active material according to another embodiment of the present invention further includes a carbon coating layer disposed on the shell. Therefore, the difference will be described.

The carbon coating layer may be disposed on the shell. Specifically, the carbon coating layer may be present on at least a portion of the surface area of the shell, more specifically, may be present on 50% to 100% of the outer surface area of the shell. Since the conductivity of the negative electrode active material may be improved by the carbon coating layer, the initial efficiency, lifespan properties, and battery capacity properties of the secondary battery may be improved.

The carbon coating layer may be 1 wt % to 15 wt %, specifically 3 wt % to 10 wt % based on the total weight of the negative electrode active material. When the above range is satisfied, the lifespan properties and output properties of the battery may be further improved.

The carbon coating layer may include a carbon-based material. The carbon-based material may include at least any one of amorphous carbon and crystalline carbon.

The crystalline carbon may further improve the conductivity of the negative electrode active material. The crystalline carbon may include at least any one selected from the group consisting of fluorene, a carbon nanotube, and graphene.

The amorphous carbon may appropriately maintain the strength of the carbon coating layer, thereby suppressing the expansion of the core. The amorphous carbon may be at least any one carbide selected from the group consisting of tar, pitch, and other organic materials, or a carbon-based material formed by using hydrocarbon as a source of chemical vapor deposition.

The carbide of the other organic materials may be a carbide of an organic material selected from the group consisting of sucrose, glucose, galactose, fructose, lactose, mannose, ribose, aldohexose or ketohexose carbides and combinations thereof.

The hydrocarbon may be substituted or unsubstituted aliphatic or alicyclic hydrocarbon, or substituted or unsubstituted aromatic hydrocarbon. Aliphatic or alicyclic hydrocarbon of the substituted or unsubstituted aliphatic or alicyclic hydrocarbon may be methine, ethene, ethylene, acetylene, propene, butane, butene, pentene, isobutene or hexane, and the like. Aromatic hydrocarbon of the substituted or unsubstituted aromatic hydrocarbon may be benzene, toluene, xylene, styrene, ethylbenzene, diphenylmethane, naphthalene, phenol, cresol, nitrobenzene, chlorobenzene, indene, coumarone, pyridine, anthracene, or phenanthrene, and the like.

The thickness of the carbon coating layer may be 10 nm to 1000 nm, specifically 100 nm to 800 nm, more specifically 200 nm to 500 nm. When the above range is satisfied, the lifespan properties and output properties of the battery may be further improved. Although not limited thereto, the thickness of the carbon coating layer may be measured by SEM or TEM.

A method for preparing a negative electrode active material according to another embodiment of the present invention may include forming a first mixture by mixing an $SiO_x$ (0<x<2) particle and magnesium powder, forming a silicon-based particle containing magnesium silicate by subjecting the first mixture to a first heat treatment, forming a second mixture by mixing the silicon-based particle and lithium powder, and subjecting the second mixture to a second heat treatment. The magnesium silicate is the same as the magnesium silicate described above with reference to the examples, and thus the description thereof will be omitted.

In the forming of the first mixture, the weight ratio of the $SiO_x$ (0<x<2) particle and the magnesium powder may be 99:1 to 70:30, specifically 95:5 to 80:20, more specifically 93:7 to 84:16. When the above range is satisfied, magnesium silicate is formed in an appropriate content, so that initial efficiency and lifespan properties of the battery may be further improved.

In the forming of the first mixture, the average particle diameter ($D_{50}$) of the $SiO_x$ (0<x<2) particle may be 1 μm to 20 μm, specifically 3 μm to 10 μm.

In the forming of a silicon-based particle including the magnesium silicate, the first heat treatment may be performed at 300° C. to 1200° C., specifically 500° C. to 1100° C., more specifically 800° C. to 1000° C. When the first heat treatment is performed at a temperature in the above range, magnesium silicate may be formed in an appropriate amount while preventing the growth of a silicon crystal, so that the lifespan properties of the battery may be improved.

In the forming of the second mixture, the weight ratio of the silicon-based particle and the lithium powder may be 99:1 to 70:30, specifically 98:2 to 80:20, more specifically 97:3 to 90:10. When the above range is satisfied, a lithium-containing compound may be formed in an appropriate content, so that initial efficiency and lifespan properties of the battery may be further improved.

In a second heat treatment step of the second mixture, the second heat treatment may be performed at 100° C. to 1000° C., specifically 300° C. to 900° C., more specifically 400° C. to 800° C. When the second heat treatment is performed at a temperature in the above range, a lithium-containing compound may be formed in an appropriate amount while preventing the growth of a silicon crystal, so that the lifespan properties of the battery may be improved.

The lithium-containing compound may be formed in a center portion of the silicon-based particle (corresponding to the core described in one embodiment) by the second heat treatment. Specifically, once magnesium silicate is formed near the surface of the silicon-based particle by the first heat treatment, there is little $SiO_2$ present in a region in which the magnesium silicate is formed even after the second heat treatment, the $SiO_2$ through which lithium metal can react with the silicon-based particles. Accordingly, most of the lithium-containing compound may be formed in the center of the silicon-based particle in which $SiO_2$ to be reacted therewith is present.

A method for preparing a negative electrode active material according to yet another embodiment of the present invention is similar to the above-described method for preparing a negative electrode active material according to another embodiment of the present. However, there is a difference in that the method for preparing a negative electrode active material according to yet another embodiment of the present invention further includes forming a carbon coating layer. Therefore, the difference will be described.

Specifically, after the second heat treatment described above with reference to another embodiment is performed, forming a carbon coating layer on an outer surface of the silicon-based particle which has been subjected to the second heat treatment may be further included.

The carbon coating layer is the same as the carbon coating layer described with reference to the above-described negative electrode active material of another embodiment. The carbon coating layer may be formed by disposing a carbon precursor on the silicon-based particle and subjecting the same to a heat treatment, but the present invention is not limited thereto.

A negative electrode according to yet another embodiment of the present invention may include a negative electrode active material. In this case, the negative electrode active material may be the same as the negative active materials of the embodiments described above. Specifically, the negative electrode may include a current collector and a negative electrode active material layer disposed on the current collector. The negative electrode active material layer may include the negative electrode active material. Furthermore, the negative electrode active material layer may include a binder and/or a conductive agent.

The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which well adsorbs carbon such as copper and nickel well may be used as the current collector. The thickness of the current collector may be from 6 μm to 20 μm, but the thickness of the current collector is not limited thereto.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, poly acrylic acid, materials having the hydrogen thereof substituted with Li, Na, or Ca, and the like, and a combination thereof. In addition, the binder may include various copolymers thereof.

The conductive agent is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive agent such as a polyphenylene derivative, and the like may be used.

A secondary battery according to yet another embodiment of the present invention may include a negative electrode, a positive electrode, a separator interposed between the positive electrode and the negative electrode, and an electrolyte. The negative electrode is the same as the negative electrode described above. Since the negative electrode has been described above, the detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, a non-woven body, and the like.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ (0≤c1≤0.33), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and 0.01≤c≤0.3); a lithium manganese composite oxide represented by the formula $LiMn_{2-c3}M_{c3}O_2$ (wherein, M is any one of Co, Ni, Fe, Cr, Zn, or Ta, and 00.01≤c3≤0.1), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive agent and a positive electrode binder, together with the positive electrode active material described above.

At this time, the positive electrode conductive agent is used to impart conductivity to an electrode, and any positive electrode conductive agent may be used without particular limitation as long as it has electronic conductivity without causing a chemical change in a battery to be constituted. Specific examples of the positive electrode conductive agent may be graphite such as natural graphite and artificial graphite; a carbon-based material such as carbon black, acetylene black, Ketjen black, channel black, furnace black, lamp black, thermal black, and carbon fibers; metal powder or metal fibers of such as copper, nickel, aluminum, and silver; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

In addition, the binder serves to improve the bonding between positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, ethylene carbonate and propylene carbonate, which are cyclic carbonates, may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing Electrode (1) Preparation of Negative Electrode Active Material
1) Mixing of SiO and Magnesium Powder and First Heat Treatment Thereof 100 g of SiO having an average particle diameter ($D_{50}$) of 6 μm and 10 g of magnesium powder having an average particle diameter ($D_{50}$) of 10 μm were mixed to prepare a first mixture. Thereafter, the first mixture was introduced into a chamber and heated for 2 hours at 950° C. to perform a first heat treatment.

2) Mixing of First Heat-Treated Particle and Lithium Powder and Second Heat Treatment Thereof 100 g of the first heat-treated particle and 6 g of lithium powder having an average particle diameter ($D_{50}$) of 5 μm were mixed to prepare a second mixture. Thereafter, the second mixture was introduced into a chamber and heated for 2 hours at 750° C. to perform a second heat treatment. A negative electrode active material was prepared therethrough.

When the prepared negative electrode active material was analyzed by XRD, ICP, and SEM, a core containing lithium silicate and a shell containing magnesium silicate were observed.

(2) Manufacturing of Negative Electrode

A mixed negative electrode active material in which the prepared negative electrode active material and graphite are mixed at a weight ratio of 1:9, carbon black as a conductive agent, carboxymethylcellulose (CMC) as a binder, and styrene butadiene rubber (SBR) were mixed at a weight ratio of 95.8:1:1.7:1.5 to prepare a mixture of 5 g. 28.9 g of distilled water was added to the mixture to prepare a negative electrode slurry. The negative electrode slurry was applied on a copper (Cu) metal thin film having a thickness of 20 μm, which is a negative electrode current collector, and then dried. At this time, the temperature of circulated air was 60° C. Thereafter, the copper (Cu) metal thin film applied with the negative electrode slurry and then dried was roll-pressed and then dried in a vacuum oven at 130° C. for 12 hours, and then punched into a circular shape of 1.4875 cm² to prepare a negative electrode.

(3) Manufacturing of Secondary Battery

The prepared negative electrode was used, and a lithium (Li) metal thin film cut into a circular shape of 1.7671 cm² was used as a positive electrode. A porous polyethylene separator was interposed between the positive electrode and the negative electrode, and then vinylene carbonate dissolved in 0.5 wt % was dissolved in a mixed solution in which methyl ethyl carbonate (EMC) and ethylene carbonate (EC) are mixed at a mixing volume ratio of 7:3. Thereafter, an electrolyte in which $LiPF_6$ of 1.0 M concentration is dissolved was injected to manufacture a lithium coin half-cell.

Example 2: Manufacturing of Battery (1) Preparation of Negative Electrode Active Material A negative electrode active material was prepared in the same manner as in Example 1 except that 35 g of magnesium powder was used. When the prepared negative electrode active material was analyzed by XRD, ICP, and SEM, a core containing lithium silicate and a shell containing magnesium silicate were observed.

(2) Manufacturing of Negative Electrode and Secondary Battery

A negative electrode and a secondary battery were manufactured in the same manner as in Example 1 except that the negative electrode active material prepared above was used.

Example 3: Manufacturing of Battery (1) Preparation of Negative Electrode Active Material A negative electrode active material was prepared in the same manner as in Example 1 except that 0.5 g of magnesium powder was used. When the prepared negative electrode active material was analyzed by XRD, ICP, and SEM, a core containing lithium silicate and a shell containing magnesium silicate were observed.

(2) Manufacturing of Negative Electrode and Secondary Battery

A negative electrode and a secondary battery were manufactured in the same manner as in Example 1 except that the negative electrode active material prepared above was used.

Comparative Example 1: Manufacturing of Battery (1) Preparation of Negative Electrode Active Material
1) Mixing of SiO and Magnesium Powder and Heat Treatment Thereof 100 g of SiO having an average particle diameter ($D_{50}$) of 6 μm and 10 g of magnesium powder having an average particle diameter ($D_{50}$) of 10 μm were mixed to prepare a first mixture. Thereafter, the first mixture was introduced into a chamber and heated for 2 hours at 950° C. to perform a heat treatment. A negative electrode active material was prepared therethrough.

When the prepared negative electrode active material was analyzed by XRD, ICP, and SEM, a core not containing a metal silicate and a shell containing magnesium silicate were observed.

(2) Manufacturing of Negative Electrode and Secondary Battery

A negative electrode and a secondary battery were manufactured in the same manner as in Example 1 except that the negative electrode active material prepared above was used.

Comparative Example 2: Manufacturing of Battery (1) Preparation of Negative Electrode Active Material
1) Mixing of SiO and Lithium Powder and Heat Treatment Thereof 100 g of SiO having an average particle diameter ($D_{50}$) of 6 μm and 6 g of lithium powder having an average particle diameter ($D_{50}$) of 5 μm were mixed to prepare a mixture. Thereafter, the mixture was introduced into a chamber and heated for 2 hours at 750° C. to perform a heat treatment. A negative electrode active material was prepared therethrough.

When the prepared negative electrode active material was analyzed by XRD, ICP, and SEM, it was observed that lithium silicate was present in the whole negative electrode active material. That is, the lithium silicate was dispersed and present in the negative electrode active material to a degree in which the core and the shell could not be distinguished by the presence of lithium silicate.

(2) Manufacturing of Negative Electrode and Secondary Battery

A negative electrode and a secondary battery were manufactured in the same manner as in Example 1 except that the negative electrode active material prepared above was used.

TABLE 1

| | Size of core (μm) | Content of lithium silicate contained in core (wt %) | Thickness of shell (μm) | Content of magnesium silicate contained shell (wt %) | Particle diameter of silicon in crystal grain in negative electrode active material (nm) |
|---|---|---|---|---|---|
| Example 1 | 6 | 4 | 0.5 | 8 | 10 |
| Example 2 | 6 | 3.8 | 4 | 30 | 13 |
| Example 3 | 6 | 4 | 0.03 | 0.4 | 9 |
| Comparative Example 1 | 6 | — | 0.5 | 8 | 10 |
| Comparative Example 2 | — | (Total content of lithium silicate contained in negative electrode active material (wt %)) | — | — | 10 |

The content of each of the lithium silicate and the magnesium silicate was measured by an ICP method based on the total weight of the negative electrode active material. The size of the core and the thickness of the shell were measured by SEM.

The particle diameter of the silicon crystal grain in the negative electrode active material was derived by applying P sherer equation to the peak 111 of silicon derived through the X-Ray Diffraction (XRD) analysis.

Test Example 1: Evaluation of Discharge Capacity, Initial Efficiency, Lifespan Properties, and Generation of Crack The batteries of Examples 1 to 3 and Comparative Examples 1 and 2 were subjected to charging and discharging to evaluate discharge capacity, initial efficiency, lifespan properties (capacity retention rate), electrode thickness change rate, and generation of a crack, and the results are shown in Table 2 below.

Meanwhile, for the first cycle and the second cycle, charging·discharging were performed at 0.1 C, and from the third cycle to the fiftieth cycle, charging·discharging were performed at 0.5 C.

Charging condition: CC (constant current)/CV (constant voltage) (5 mV/0.005 C current cut-off)
Discharging condition: CC (constant current) Condition 1.5 V The discharge capacity (mAh/g) and the initial efficiency (%) were derived from the result of one charge/discharge. Specifically, the initial efficiency (%) was derived by the following calculation.

Initial efficiency (%)=(discharge capacity after 1 discharge/charge capacity of 1 time)×100

The capacity retention rate was derived by the following calculation.

Capacity retention rate (%)=(discharge capacity of 49 times/discharge capacity of 1 time)×100

In addition, the generation of a crack was determined by measuring a cross-section of the negative electrode in the negative electrode with SEM after measuring the capacity retention rate.

TABLE 2

| Battery | Discharge capacity (mAh/g) | Initial efficiency (%) | Capacity retention rate (%) | Generation of crack |
|---|---|---|---|---|
| Example 1 | 460 | 90 | 80 | X |
| Example 2 | 440 | 91 | 77 | X |
| Example 3 | 450 | 89 | 72 | X |
| Comparative Example 1 | 450 | 87 | 65 | O |
| Comparative Example 2 | 450 | 88 | 70 | O |

Referring to Table 2, after the cycle, a crack was not generated in the negative electrode active material of Examples 1 to 3. However, a crack was generated in the negative electrode active material of Comparative Examples 1 and 2. Also, the initial efficiency and capacity retention rate of Examples 1 to 3 were higher than the initial efficiency and capacity retention rate of Comparative Examples 1 and 2. From the results, it can be confirmed that the initial efficiency and lifespan properties of the battery were improved since the lithium-containing compound was included in the core and the magnesium silicate was included in the shell, the metal-containing compound was uniformly dispersed in the overall negative electrode active material, so that the non-uniform expansion of the negative electrode active material is suppressed, thereby reducing cracks.

In addition, since the discharge capacity and capacity retention rate of Examples 2 and 3 are smaller than those of Example 1, it can be confirmed that the discharge capacity and capacity retention rate may be further improved in case the content of the magnesium silicate contained in the shell satisfies an appropriate level. In the cases of Examples 2 and 3, since an excessively large amount, or an excessively small amount of the magnesium silicate was contained in the negative electrode active material, the metal-containing compound was dispersed in the negative electrode active material relatively less uniformly when compared with Example 1. Therefore, the degree to which the volume expansion of the negative electrode active material is suppressed is shown to be lower than in the case of Example 1. Also, in the case of Example 3, since a small amount of the magnesium silicate was contained in the shell, the hardness of the shell was lower than that of Examples 1 and 2, and thus the capacity retention rate thereof is shown to be inferior to that of Examples 1 and 2.

The invention claimed is:

1. A negative electrode active material, comprising:
a core comprising $SiO_x$ (0≤x<2) and a lithium-containing compound comprising at least one selected from the group consisting of lithium silicate and lithium silicide, wherein the lithium silicate comprises at least one selected from the group consisting of $Li_2Si_2O_5$, $Li_2SiO_3$, and $Li_4SiO_4$, and wherein the lithium silicide comprises $Li_ySi$ (2<y<5); and
a shell disposed on the core comprising the same $SiO_x$ (0≤x<2) and magnesium silicate,
wherein the magnesium silicate comprises at least one selected from the group consisting of $Mg_2SiO_4$, and $MgSiO_3$.

2. The negative electrode active material of claim 1, wherein the lithium silicate in the core is present in an amount of 0.1 wt % to 50 wt % based on a total weight of the negative electrode active material.

3. The negative electrode active material of claim 1, wherein an average particle diameter ($D_{50}$) of the core is 1 μm to 20 μm.

4. The negative electrode active material of claim 1, wherein the magnesium silicate in the shell is present in an amount of 0.1 wt % to 50 wt % based on a total weight of the negative electrode active material.

5. The negative electrode active material of claim 1, wherein a thickness of the shell is 0.02 μm to 5 μm.

6. The negative electrode active material of claim 1, further comprising a carbon coating layer disposed on an outer surface of the shell comprising a carbon-based material, wherein a thickness of the carbon coating layer is 10 nm to 1000 nm.

7. The negative electrode active material of claim 6, wherein the carbon coating layer is present on 50% to 100% of the outer surface area of the shell.

8. A negative electrode comprising the negative electrode active material of claim 1.

9. A secondary battery comprising:
the negative electrode of claim 8;
a positive electrode;
a separator interposed between the positive electrode and the negative electrode; and
an electrolyte.

* * * * *